(12) United States Patent
Urita

(10) Patent No.: US 6,188,573 B1
(45) Date of Patent: *Feb. 13, 2001

(54) INFORMATION PROCESSING DEVICE, PERIPHERAL DEVICE AND ATTACHMENT DEVICE

(75) Inventor: Kenji Urita, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/160,294

(22) Filed: Sep. 25, 1998

(51) Int. Cl.$^7$ ................ H05K 7/20; F24F 7/007
(52) U.S. Cl. ............ 361/687; 361/688; 361/690; 361/695; 165/80.3; 454/186
(58) Field of Search ................ 361/687, 688, 361/694–697, 715, 690; 415/208, 208.1, 208.2, 208.3; 165/80.3, 121–126, 185, 104.34; 454/184–186

(56) References Cited

U.S. PATENT DOCUMENTS

| | | | |
|---|---|---|---|
| 5,079,438 | * | 1/1992 | Heung .................. 307/141 |
| 5,171,183 | * | 12/1992 | Pollard et al. .............. 454/184 |
| 5,511,055 | * | 4/1996 | Otsuki et al. .............. 369/75.1 |
| 5,680,294 | * | 10/1997 | Stora et al. .................. 361/695 |
| 5,754,396 | * | 5/1998 | Feleman et al. ............ 361/683 |
| 5,822,188 | * | 10/1998 | Bullington ................ 361/695 |
| 5,862,037 | * | 1/1999 | Behl ............................ 361/687 |
| 5,871,396 | * | 2/1999 | Shen ........................ 454/184 |

FOREIGN PATENT DOCUMENTS

| | | |
|---|---|---|
| 1-168099 | 7/1989 | (JP) . |
| 5-259672 | 10/1993 | (JP) . |
| 6-45778 | 2/1994 | (JP) . |
| 6-67756 | 3/1994 | (JP) . |
| 9-198483 | 7/1997 | (JP) . |
| 3044579 | 10/1997 | (JP) . |
| 10-49258 | 2/1998 | (JP) . |
| 10-76783 | 3/1998 | (JP) . |

* cited by examiner

Primary Examiner—Leo P. Picard
Assistant Examiner—Anatoly Vortman
(74) Attorney, Agent, or Firm—Staas & Halsey LLP (57) ABSTRACT

An information processing device includes a main body having a bay, and a peripheral device which can detachably be loaded to the bay. The peripheral device includes a cooling unit, which is accommodated in the bay with the peripheral device loaded to the bay.

54 Claims, 11 Drawing Sheets

INFORMATION PROCESSING DEVICE, PERIPHERAL DEVICE AND ATTACHMENT DEVICE

BACKGROUND OF THE INVENTION

1. Field of the Invention

The present invention generally relates to information processing devices, and more particularly to an information processing device in which a peripheral device which is an optional unit is detachably loaded to a bay of the information processing device main body.

A notebook type personal computer, which is a portable information processing device, is designed to have expanded functions so that a peripheral device which is prepared as an optional unit can be connected to the computer. There are generally available three formations for making a connection between the notebook type personal computer and the peripheral device. The first connecting formation uses a connector cable which connects the notebook type personal computer to the peripheral device which is provided outside of the computer. The second connecting formation uses an expansion station on which the notebook type personal computer is overlaid. The third connecting formation uses an arrangement in which the peripheral device is detachably loaded to the bay of the notebook type personal computer.

The third connecting formation is preferable in terms of the operationability of the notebook type personal computer. However, the third connecting formation is required to improve generation of heat because the peripheral device is loaded within the bay of the notebook type personal computer. The notebook type personal computer is equipped with a battery as a power source, and is thus required to reduce power consumption. In this regard, only a limited number of fans is allowed to be equipped with the notebook type personal computer.

2. Description of the Related Art

Figure 1:
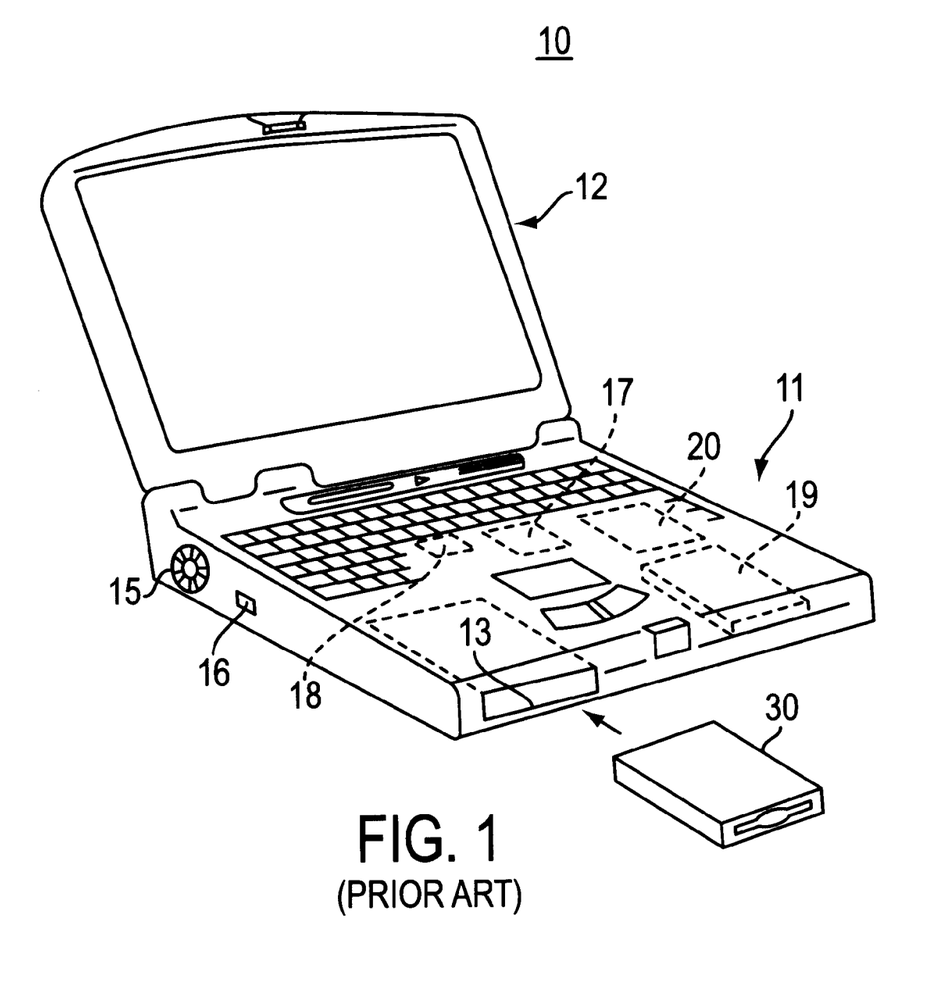
FIG. 1 is a perspective view of a conventional notebook type personal computer.

FIG. 1 shows a conventional notebook type personal computer 10, which is made up of a notebook type personal computer main body 11 and a liquid crystal panel part 12 which can be opened. The computer main body 11 has a bay 13, a keyboard part 14, a cooling fan 15, a communication use connector 16, a CPU 17, a modem module 18, a hard disk drive 19 and a battery 20. The computer 10 receives electricity from the battery 20 and operates.

When it is desired to expand the functions of the computer 10, for example, a floppy disk drive 30 is detachably loaded to the bay 13. The floppy disk drive 30 does not have a cooling fan.

The cooling fan 15 is attached to a side surface of the computer main body 11 and is located in a rear-side portion thereon. The communication connector 16 is connected to the side surface of the main body 11. The CPU 17 is provided in the center portion within the computer main body 11. The modem module 18 is separate from the communication connector 16, and is provided in the center portion within the computer main body 11. The cooling fan 15 is driven when the floppy disk drive 30 is loaded to the bay 13 in order to use an expanded function of the personal computer 10.

However, the position of the cooling fan 15 attached to the computer main body 11 depends on the design of the notebook type personal computer 10. Generally, the cooling fan 15 is attached to the side surface of the computer main body 11. Hence, the cooling fan 15 cannot efficiently and effectively cool the floppy disk drive 30 loaded to the bay 13 as well as the CPU 17 and the modem module 18.

A peripheral device or a battery can be detachably attached to the bay 13 of the personal computer 10. Conventionally, cooling of the device attached to the bay 13 is carried out on the side of the main body of the personal computer 10. That is, the cooling fan cools the computer main body 11 and radiates heat generated by the peripheral device or the battery attached to the bay 13.

The cooling mechanism is installed in the computer main body 11 irrespective of the system structure thereof. Hence, even a system which is not required to be cooled is equipped with the cooling mechanism. This increases the production cost.

If a peripheral device which can be loaded to the bay 13 of the computer 10 has a small amount of generation of heat, the cooling fan 15 will not be required to operate. An example of such a peripheral device is a secondary or additional battery. Hence, the computer 10 is expensive to the users who generally use the secondary battery because the computer 10 is equipped with the cooling fan 15, which is not used for the floppy disk drive 30.

That is, the cooling mechanism of the notebook type personal computer 10 is required to be designed so that the peripheral device or the battery which is to be attached to the bay 13 and generates the largest amount of heat can sufficiently be cooled. However, the devices to be attached to the bay 13 have respective amounts of heat, which are not different from each other. Generally, the battery and the floppy disk drive 30 have a comparatively small amount of heat generation. A CD-ROM device, a hard disk drive or a digital volatile drive, which can be attached to the bay 13, rotate built-in recording media at high speeds and comparatively large amounts of heat generations.

Hence, it is required to design the computer main body 11 so that it can sufficiently cool various devices having different amounts of generation of heat to be attached to the bay 13. In other words, it is required that the computer main body 11 is capable of sufficiently cooling the peripheral device having the maximum amount of generation of heat.

However, selection of the peripheral devices to be attached to the bay 13 depends on the user. Hence, the notebook type personal computer 10 is expensive with respect to the user who uses peripheral devices having relatively small amounts of generation of heat. All the system structures are equipped with the cooling fans, and the production cost thereof is expensive.

The peripheral devices to be attached to the bay 13 function as respective heat generation sources. The cooling fan and the heat radiating part are located taking into account the design and layout of boards of the notebook type personal computer, independently of the locations of the heat generating sources. Hence, the cooling efficiency is low.

SUMMARY OF THE INVENTION

It is a general object of the present invention to provide an information processing device, a peripheral device and a communications device in which the above disadvantage is eliminated.

The above object of the present invention is achieved by an information processing device comprising: a main body having a bay; and a peripheral device which can detachably be loaded to the bay, the peripheral device including a cooling unit, which is accommodated in the bay with the peripheral device loaded to the bay.

The information processing device may be configured so that the cooling unit is located in a deep portion of the bay in a state in which the peripheral device is loaded to the bay.

The information processing device may be configured so that the cooling unit cools the peripheral device itself in a state in which the peripheral device is loaded to the bay.

The information processing device may be configured so that the cooling unit cools the information processing device.

There is also provided a peripheral device which can be loaded to a bay of an information processing device, the peripheral device comprising: a cooling unit which is accommodated in the bay and is located in the information processing device when the peripheral device is loaded to the information processing device.

The peripheral device may be configured so that the cooling unit is located in a deep portion of the bay in a state in which the peripheral device is loaded to the bay.

The peripheral device may be configured so that the cooling unit cools the peripheral device itself in a state in which the peripheral device is loaded to the bay.

The peripheral device may be configured so that the cooling unit cools the information processing device.

There is also provided an information processing device comprising: a main body; and an attachment unit which can be attached to the main body, wherein the attachment unit comprises: at least one module used in the main body; a plate supporting the module; and a cooling unit which cools the module and is located in the main body with the attachment unit attached to the main body.

The information processing device may be configured so that the attachment unit is a communication device which can be attached to the main body in accordance with a communication specification.

The information processing device may be configured so that the attachment unit includes at least one communication module which is detachably provided therein.

The information processing device may be configured so that: the attachment unit comprises a vertical wall which forms, with the attachment unit attached to the main body, part of a case of the information processing device and is substantially vertical to the plate; and the cooling unit is provided inside the vertical wall.

The information processing device may be configured so that the cooling unit cools the main body of the information processing device.

There is also provided an attachment unit attached to a main body of an information processing device, the attachment unit comprising: at least one module used in the main body; a plate supporting the module; and a cooling unit which cools the module and is located in the main body with the attachment unit attached to the main body.

The attachment unit may be configured so that the attachment unit is a communication device which can be attached to the main body in accordance with a communication specification.

The attachment unit may be configured so that the attachment unit includes at least one communication module which is detachably provided therein.

The attachment unit may be configured so that: the attachment unit comprises a vertical wall which forms, with the attachment unit attached to the main body, part of a case of the information processing device and is substantially vertical to the plate; and the cooling unit is provided inside the vertical wall.

The attachment unit may be configured so that the cooling unit cools the main body of the information processing device.

The above cooling unit may be a cooling fan.

There is also provided an information processing device comprising: a main body having a bay; a peripheral device which can detachably be loaded to the bay; and an attachment unit attached to the main body, the peripheral device including a first cooling unit, which is accommodated in the bay with the peripheral device loaded to the bay, the attachment unit including a second cooling unit, which is accommodated in the information processing device with the attachment unit attached to the information processing device.

The information processing device may be configured so that the first cooling unit is located in a deep portion of the bay in a state in which the peripheral device is loaded to the bay.

The information processing device may be configured so that the first cooling unit cools the peripheral device itself in a state in which the peripheral device is loaded to the bay.

The information processing device may be configured so that the first cooling unit cools the information processing device.

The information processing device may be configured so that the attachment unit is a communication device which can be attached to the main body in accordance with a communication specification.

The information processing device may be configured so that the attachment unit includes at least one communication module which is detachably provided therein.

The information processing device may be configured so that the second cooling unit cools the attachment unit attached to the information processing device.

The information processing device may be configured so that the second cooling unit cools the main body of the information processing device.

The information processing device may be configured so that the first and second cooling units are respectively first and second cooling fans.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 2:
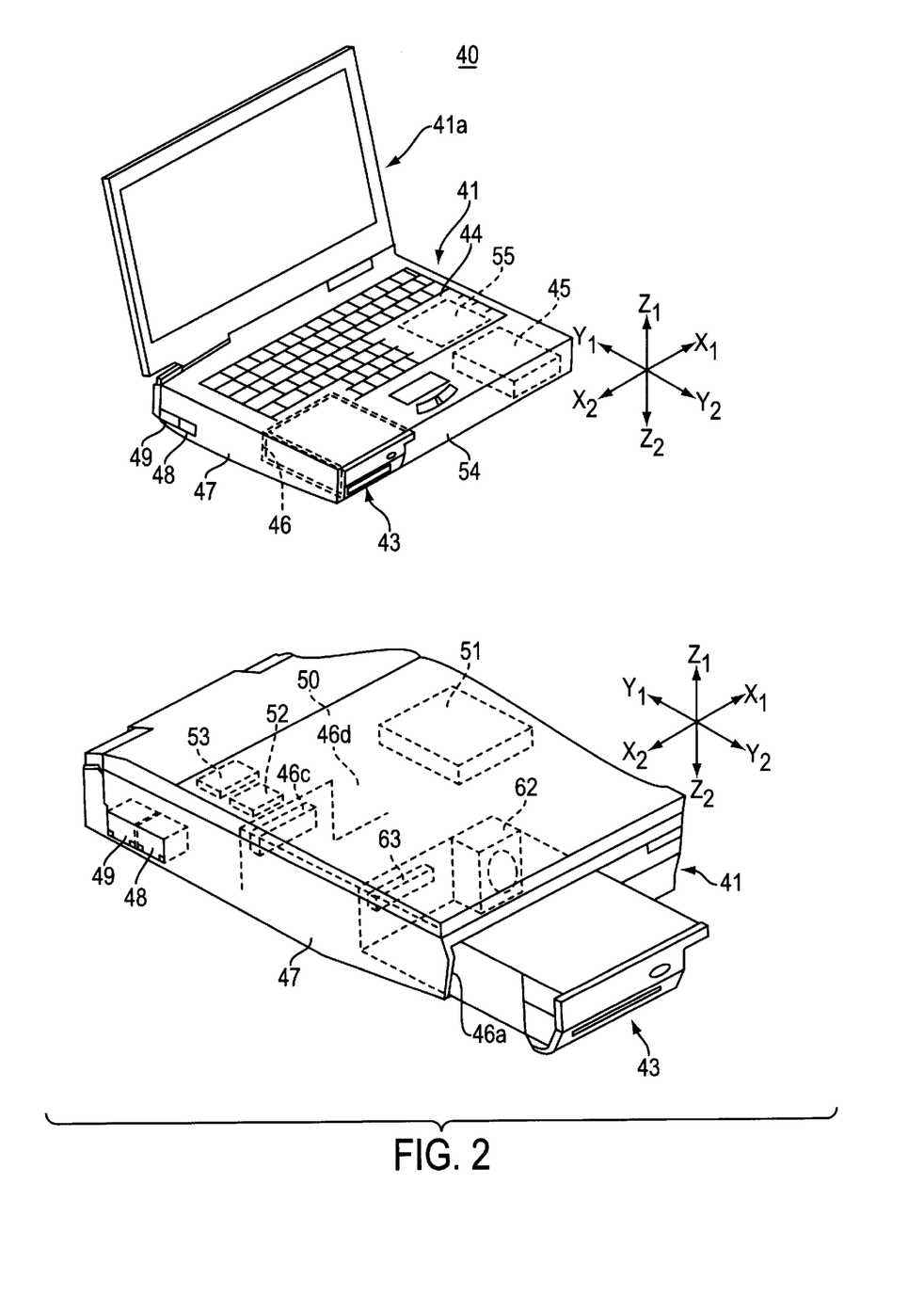
FIG. 2 is a partially enlarged, perspective view of a notebook type personal computer according to a first embodiment of the present invention.

FIG. 2 shows a notebook type personal computer 40 according to a first embodiment of the present invention. The computer 40 employs the specification of the communication functions "MODEM˙LAN" (interfaces with a modem and LAN), and the functions of the computer 40 can be expanded by loading a CD-ROM/floppy disk combination drive 43 thereto. The computer 40 has a notebook type personal computer main body 41, to which a liquid crystal display panel 41a is rotatably attached. The combination drive 43 can detachably be loaded to the computer main body 41. A battery 55 can be loaded to the computer main body 41 and receives electricity therefrom. In FIG. 2, symbols X1 and X2 denote width directions, symbols Y1 and Y2 denote depth directions, and symbols Z1 and Z2 denote height directions.

The computer main body 41 has a keyboard part 44 on the upper surface thereof, and has a hard disk drive 45 and the battery 55 provided on the bottom surface thereof. The computer main body 41 has a bay 46, which is a space in which the peripheral device is detachably accommodated in the direction X2. The computer main body 41 has a modem connector 48 and a LAN connector 49 on a side surface 47 of the computer main body 41 extending in the direction X2. Further, a CPU 51, a modem module 52 and a LAN module 53 are provided within the computer main body 41. The CPU 51, the modem module 52, the LAN module 53, the modem connector 48 and the LAN connector 49 are mounted on a printed circuit board 50. A heat radiating fin is provided to the CPU 51, which generates a large amount of heat. The computer main body 41 is not equipped with a cooling fan.

A description will now be given of the CD-ROM/floppy disk combination drive 43.

Referring to FIG. 2, the bay 46 is formed in the direction X2 and has an inlet 46a in a front surface 54 of the computer main body 41. A connector 46c and a window 46d are provided in the deep portion of the bay 46 in the direction Y1.

Figure 3:
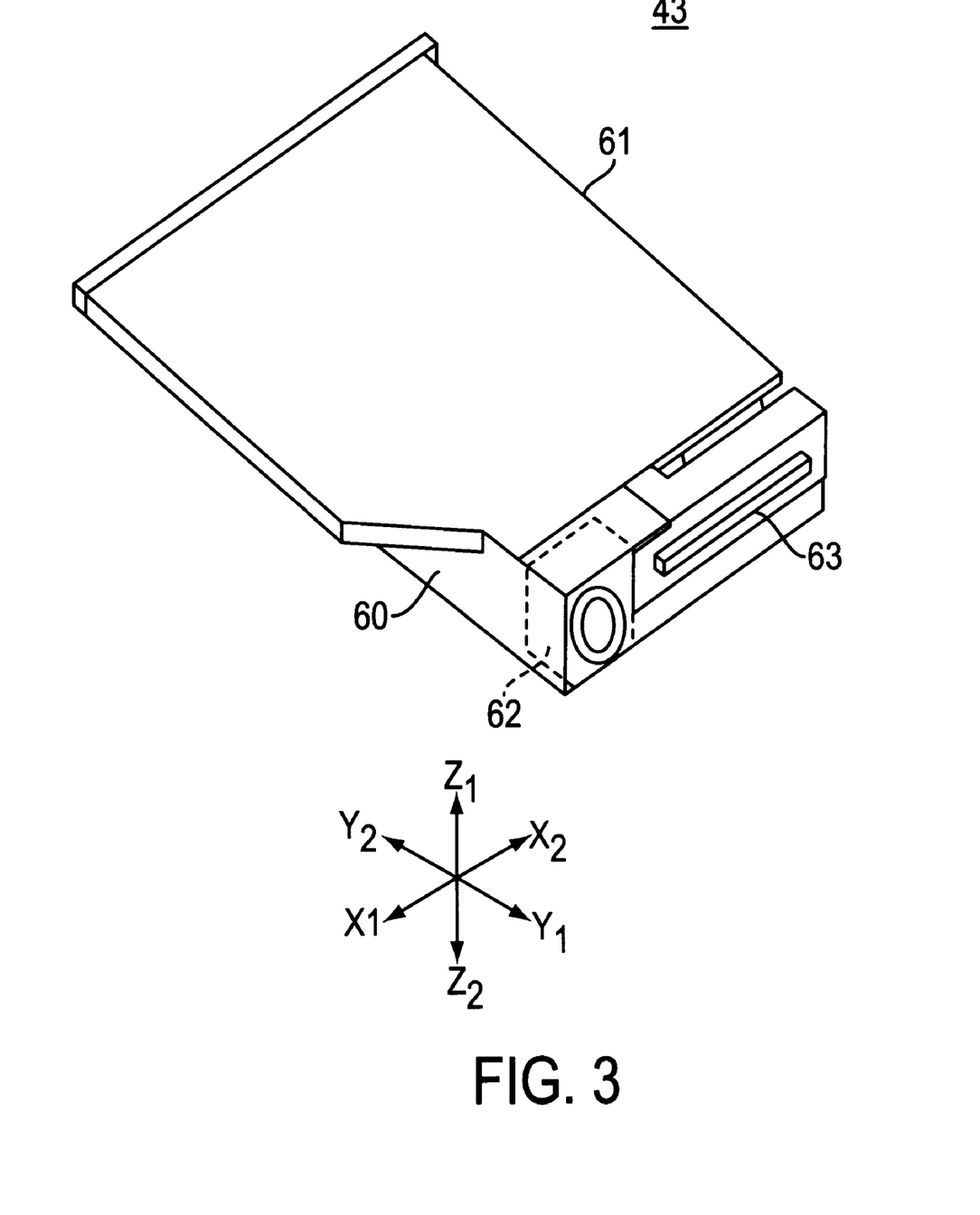
FIG. 3 is a perspective view of a CD-ROM/floppy disk combination drive used in embodiments of the present invention.
Figure 4:
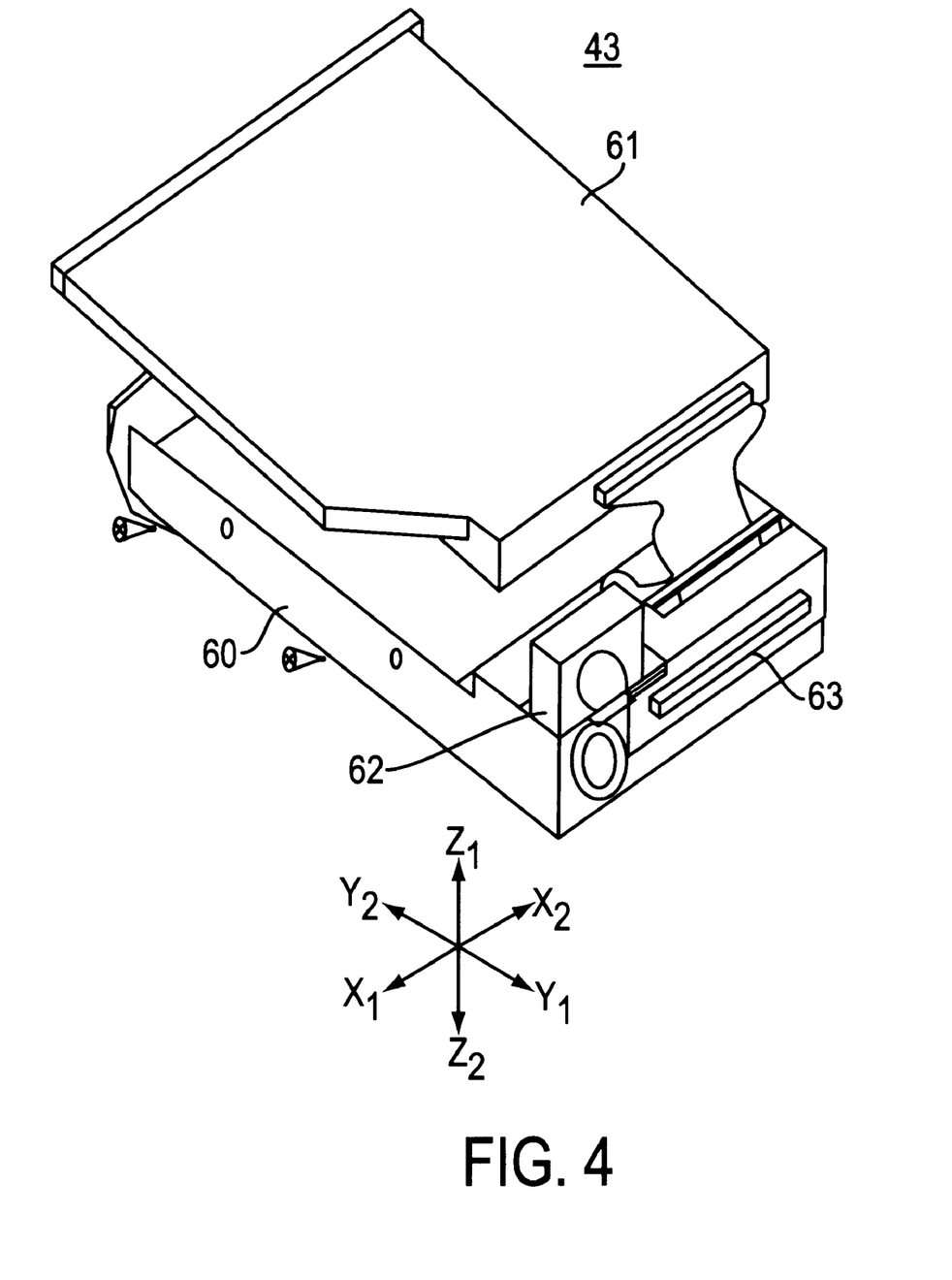
FIG. 4 is a exploded perspective view of the drive shown in FIG. 3.

As shown in FIGS. 3 and 4, the combination drive 43 has a floppy-disk drive 60 located on the lower side thereof, and a CD-ROM drive 61 is overlaid thereon, so that the drives 60 and 61 are integrated. A cooling fan 62 and a connector 63 are attached to an end of the combination drive 43 in the Y1 direction. The floppy disk drive 60 has a turn table and a magnetic head. The CD-ROM drive 61 has a turn table and an optical head.

The end of the combination drive 43 in the Y1 direction is inserted into the inlet 46a so that the combination drive 43 can be loaded to (i.e., into) the bay 46. The connector 63 of the combination drive 43 is connected to the connector 46c provided in the bay 46. The cooling fan 62 is accommodated in the bay 46 and is located close to the CPU 51. As will be described later, the cooling fan 62 cools the combination drive 43 and the CPU 51.

The personal computer 40 is operated while the cooling fan 62 is being driven. When the cooling fan 62 is rotated, it draws air outside of the personal computer 40 and sends out the drawn air to the inside of the personal computer 40. As indicated by arrows 70a, 70b and 70c shown in FIG. 5, flows of air are formed. Hence, the floppy disk drive 60 and the CD-ROM drive 61 are efficiently and effectively cooled by the flow of air. The flow 70c of air sent out by the cooling fan 62 acts on air within the computer main body 41. Since the cooling fan 62 is located in the bay 46, the air in the computer main body 41 can be moved well, as compared with a case where a cooling fan is provided outside of the bay 46. Since the cooling fan 62 is located close to the CPU 51, air enclosing the CPU 51 can be moved well. Hence, the modem module 52, the LAN module 53 and the CPU 51 provided within the personal computer 41 can be efficiently and effectively cooled.

Figure 5:
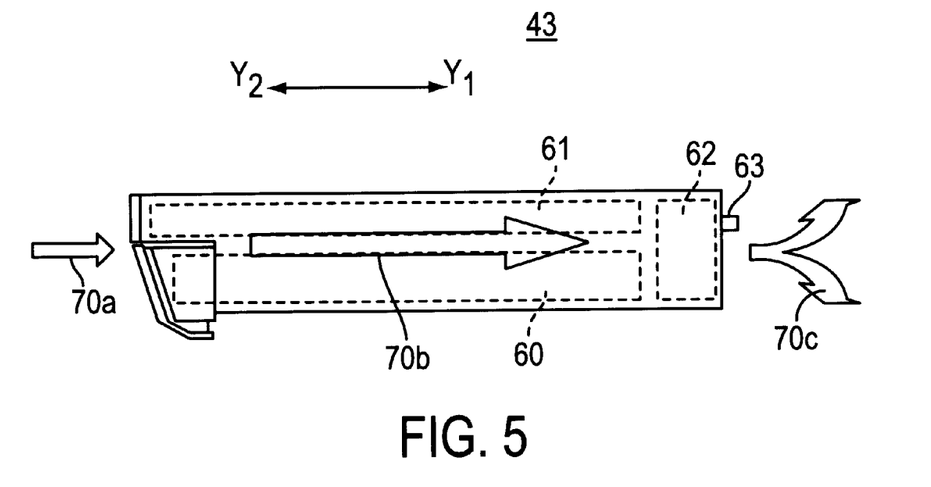
FIG. 5 is a diagram showing a flow of air caused by a cooling fan shown in FIG. 3.

The cooling fan 62 may flow air in the reverse direction. In this case, the air in the computer main body 41 can be efficiently and effectively drawn out therefrom, and can efficiently and effectively cool not only the floppy disk drive 60 and the CD-ROM drive 61 but also the modem module 52, the LAN module 53 and the CPU 51 provided in the computer main body 41.

Figure 6:
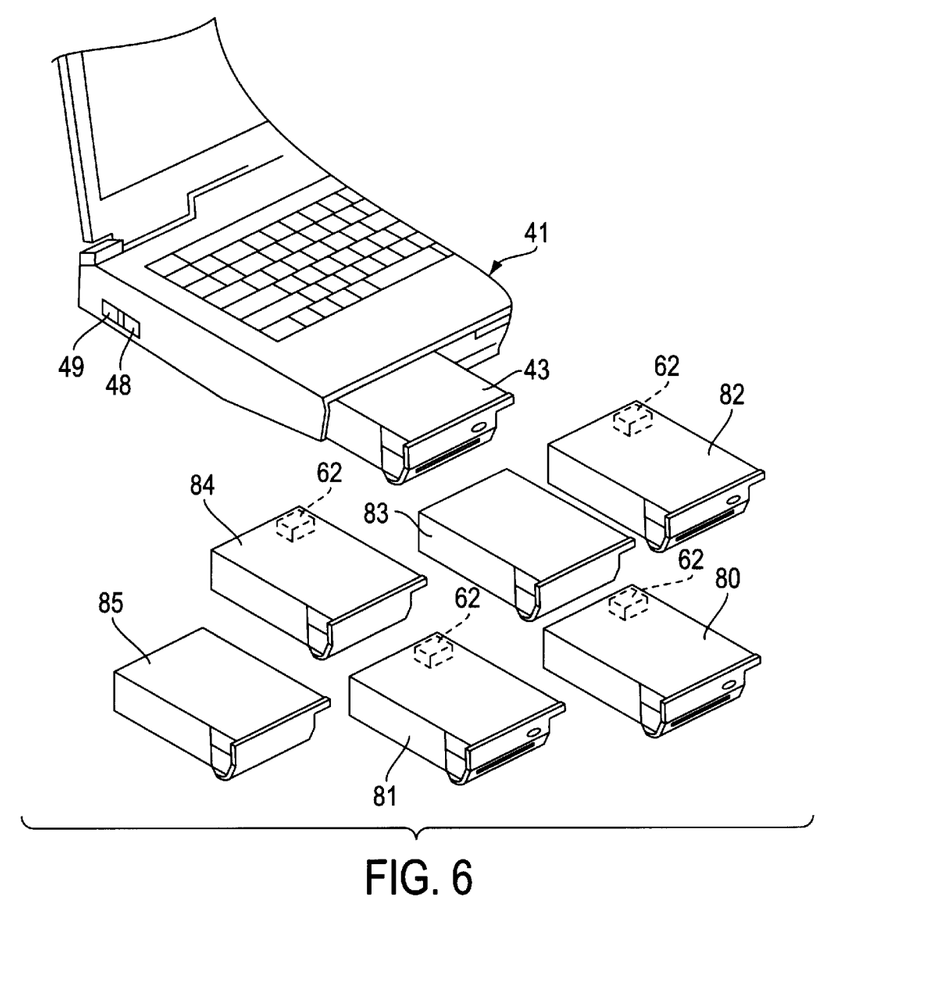
FIG. 6 is a perspective view of various peripheral devices which can be used in the first embodiment of the present invention.

FIG. 6 shows peripheral devices which can be loaded to the bay 46. Beside the CD-ROM/floppy disk combination drive 43, there are prepared a CD-ROM/high-capacity floppy disk combination drive 80, a DVD˙ROM/floppy disk combination drive 81, a DVD-ROM/high capacity floppy disk combination drive 82, a secondary battery 83, and a secondary hard disk drive 84. The above combination drives 80–84 have outer shapes substantially identical to that of the combination drive 43. The combination drives 80, 81, 82 and 84 have a large amount of generation of heat, and are thus equipped with the respective cooling fans 62. The secondary battery 83 has a small amount of generation of heat, and is not equipped with the cooling fan 62. A reference number 85 indicates a dummy drive, which has an outer shape substantially identical to that of the combination drive 43.

When the computer 40 is used without any of the expanded functions, the user draws the combination drive 43 from the bay 46, and loads the dummy drive 85 to the bay 46. If the user wishes to use any of the expanded functions provided by the secondary battery 83 or the drives 43, 80–82 and 84, the corresponding peripheral device is loaded to the bay 46.

The user who wishes to use no expanded functions or to use only the secondary battery 83 would like to have the computer 40 only or the combination of the computer 40 and the dummy drive 85. The computer 40 does not have any cooling fan. Thus, the cost of the computer 40 is less than that of the conventional computer 10 equipped with the cooling fan 15. Thus, the combination of the computer 40 and the secondary battery 83 or the dummy drive 85 is less expensive than the conventional combination with the computer 10.

The computer 40 shown in FIG. 2 may be designed so that the cooling fan is provided in the position 15 in the conventional computer 10. The other parts of the computer 40 are the same as shown in FIGS. 2 through 6. The cooling fan 15 is provided in the computer 40 shown in FIG. 2 and cools the CPU 51. This arrangement efficiently and effectively cools the CPU 51 when a peripheral device which does not have the cooling fan is attached to the bay 46. In this arrangement, the cooling fan 15 may not be required to have a capability of cooling the peripheral device 43 but may be required to have a capability of cooling the computer main body 41 (or the computer main body 41 or the peripheral device attached to the bay 46 having the smaller amount of generation of heat). That is, the notebook type personal computer 40 is not required to have the cooling fan 15 capable of cooling the peripheral device having the maximum amount of generation of heat but to have a lower capability of cooling. When the peripheral device 43 has a relatively large amount of generation of heat, the cooling fan 62 provided therein can cool the peripheral device 43. Hence, even when the notebook personal computer 40 is equipped with the cooling fan 15, it is enough for the cooling fan 15 to have a capability of cooling the computer main body 41 (or the computer main body 41 or the peripheral device attached to the bay 46 having the smaller amount of generation of heat). Hence, the computer 40 is not required to have a cooling fan having a high cooling capability. This contributes to reducing the production cost. That is, even when the cooling fan 15 is provided in the same position in the arrangement shown in FIG. 1 as shown in FIG. 1, the cooling fan 15 is not required to totally ensure cooling the drive 43 and is not required to have a high cooling capability. Thus, the cost of the computer main body 41 can be reduced.

Though the embodiment of the present invention shown in FIG. 2 does not have the cooling fan, a chip such as the CPU 51 is required to be cooled. As has been described previously, a heat pipe or heat radiating plate can be used. When a cooling structure such as a heat pipe or heat radiating plate is employed, the personal computer 40 may be designed to obtain a maximum cooling capability by joining the peripheral device attached to the bay 46 to the heat pipe or the heat radiating plate. However, the present invention does not have such a particular cooling structure. This is because the peripheral device 46 itself is equipped with the cooling fan. The cooling structure employing the heat pipe or the heat radiating plate may be required to have a capability of cooling the computer main body 41 (or the computer main body 41 and the peripheral device attached to the bay 46 having the smaller amount of generation of heat).

As shown in FIG. 2, the arrangement in which the cooling fan is not installed in the computer main body 41 improves the degree of freedom in design of the notebook type personal computer. Further, as has been described previously, the cooling fan can be provided in the same position in the computer main body 41 as shown in FIG. 1. Even in this arrangement, the cooling fan provided in that position is not required to ensure cooling the peripheral device 43 through air. Hence, it is possible to improve the degree of freedom in design of the board layout of the computer main body 41.

A description will now be given, with reference to FIG. 7, of a notebook type personal computer 40A according to a second embodiment of the present invention. The computer 40A has communication interfaces with the modem and LAN. The computer 40 has a computer main body 41 and a liquid crystal display panel 41a which can be opened. The computer main body 41A has an arrangement in which a modem/LAN device 91, which is a communication device, is secured to a common notebook type personal computer 90 by a screw 92. The modem/LAN device 91 is defined as an attachment unit.

The common computer main body 90 has, independent of the communication specification to be employed, the keyboard part 44, the hard disk drive 45, a printed circuit board 50A, the CPU 51, and a CD-ROM/floppy disk combination drive 96. Further, the computer main body 90 has an opening 93, through which a communication device such as the device 91 can be attached to the computer main body 90.

The opening 93 extends from the side surface 47 of the computer main body 90 to a bottom surface 94. The modem module 52 and the LAN module 53 are not mounted on the printed circuit board 50A.

Figure 8:
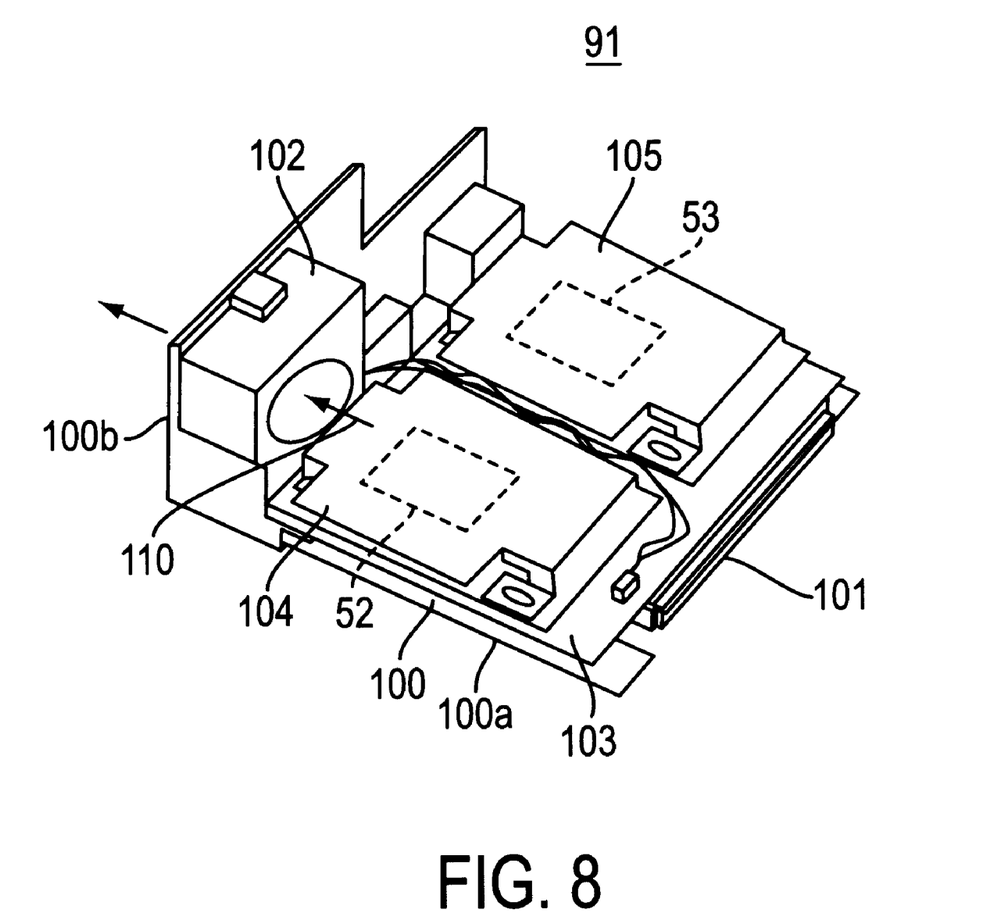
FIG. 8 is a perspective view of a modem/LAN device used in the second embodiment of the present invention.

The modem/LAN device 91 has the function for communicating, which is separated from the printed circuit board 50 shown in FIG. 2. As shown in FIG. 8, the model/LAN device 91 has a frame 100, to which a model module 52, a LAN module 53, a connector 101 and a cooling fan 102 are attached. The frame 100 has a horizontal plate part 100a and a vertical wall part 100b, and has an approximately L-shaped structure. The modem module 52 and the LAN module 53 are mounted side by side on a printed circuit board 103. The connector 101 is mounted to an end of the printed circuit board 103. The printed circuit board 103 is attached on the horizontal plate part 100a. The cooling fan 102 is attached to the inner surface of the vertical wall part 100b. The cooling fan 102 functions to cool not only the modem module 52 and the LAN module 53 but also the CPU 51. The modem module 52 and the LAN module 53 are respectively covered by shield plates 104 and 105.

The connector 101 of the modem/LAN device 91 is connected to the connector 95, and is accommodated in the opening 93 so that the frame 100 shuts up the opening 93. The cooling fan 102 is located in the opening 93, and can be loaded to (i.e., into) the computer main body 41A.

The computer 40A operates while the cooling fan 102 provided in the modem/LAN device 91 is being driven. The cooling fan 102 is rotated while it draws air in the computer 40A and sends out the drawn air to the outside thereof. Thus, the flow of air is formed as indicated by an arrow with reference number 110 attached shown in FIGS. 7 and 8. The cooling fan 102 is located in the opening 93 and is thus located in the computer main body 41A. Thus, the air in the computer main body 41A can be efficiently and effectively drawn to the outside thereof, as compared with a case where a cooling fan is provided outside of the computer main body 41A. Hence, the flow of air is created in the computer main body 41A. Thus, the air flows through the modem module 52 and the LAN module 53 so that these modules can be efficiently and effectively cooled. Further, the flow of air formed in the computer main body 41A efficiently and effectively cools the CPU 51 provided therein.

Figure 7:
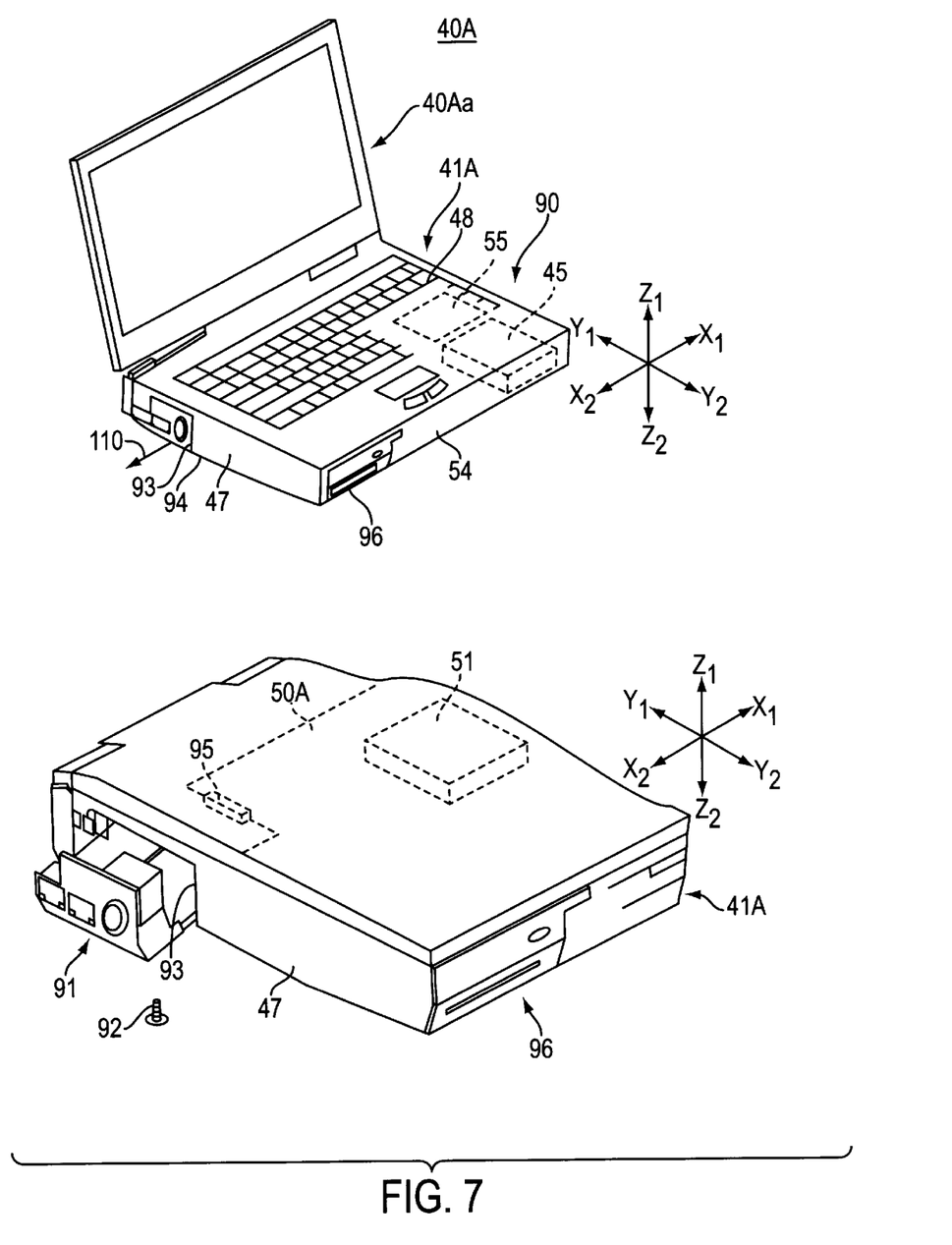
FIG. 7 is a partially enlarged, perspective view of a notebook type personal computer according to a second embodiment of the present invention.

The cooling fan 102 may form the flow or air in the direction reverse to that indicated by the arrow 110 shown in FIGS. 7 and 8. In this case, air outside of the computer main body 41A is drawn therein, and efficiently and effectively cools the modem module 52, the LAN module 53 and the CPU 51.

Figure 9:
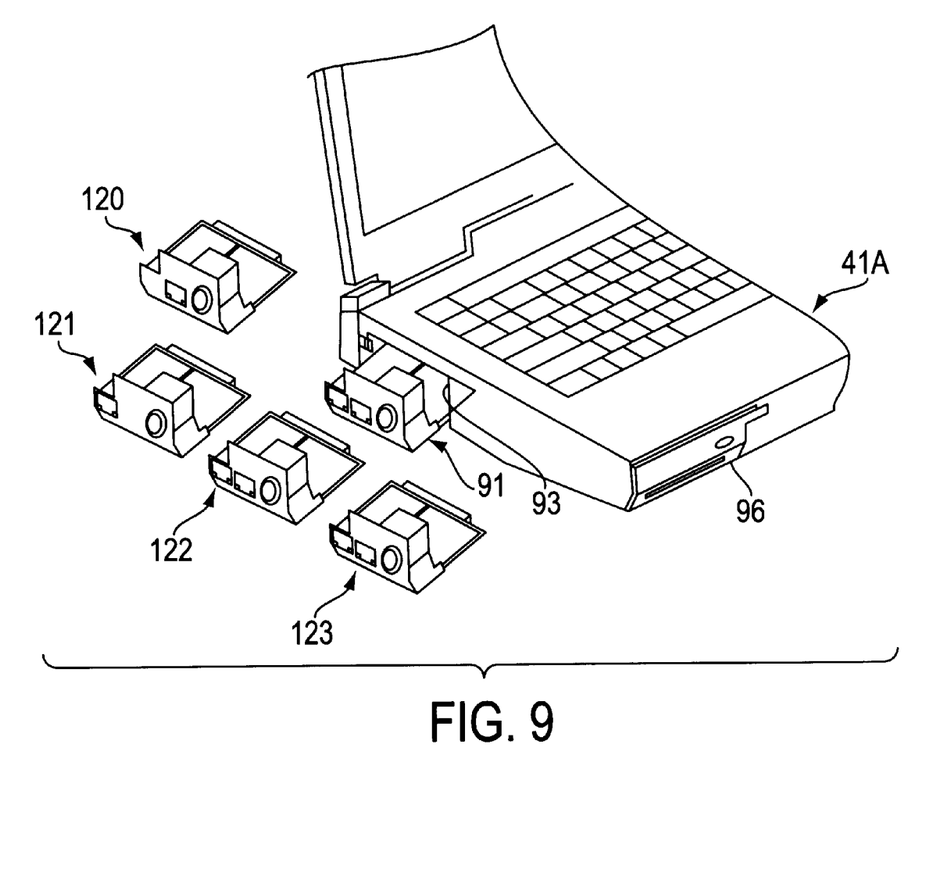
FIG. 9 is a perspective view of various communication devices which can be used in the second embodiment of the present invention.

FIG. 9 shows communication devices, which can be loaded to the computer main body 41A. Beside the modem/LAN device 91, there are prepared another attachment units such as a modem device 120 with a modem module installed therein, a LAN device 121 with a LAN module installed therein, a modem/IEEE 1394 device 122 with a modem module and an IEEE 1394 installed therein, and a LAN/IEEE 1394 device 123 with a LAN and an IEEE 1394 device installed therein. Each of the above devices 91 and 120–123 has the frame 100 and the cooling fan 102, as shown in FIG. 8. Two arbitrary modules can be installed in the communication device during the manufacturing process so that the computers 40A which conform with the various specifications can easily be produced. The modules for communications are not mounted on the printed circuit board 50A which is of a large size but are provided in the communication devices separately from the board 50A. Hence, it is no longer to manage the printed circuit boards provided in the computer main body in terms of the respective communication functions. That is, it is enough to prepare only one type of printed circuit boards, while the desired communication functions be easily available by varying the combination of two modules to be installed in the communication devices. Hence, it is possible to easily manage the notebook type personal computers equipped with the communication functions selected in accordance with the individual specifications.

Figure 10:
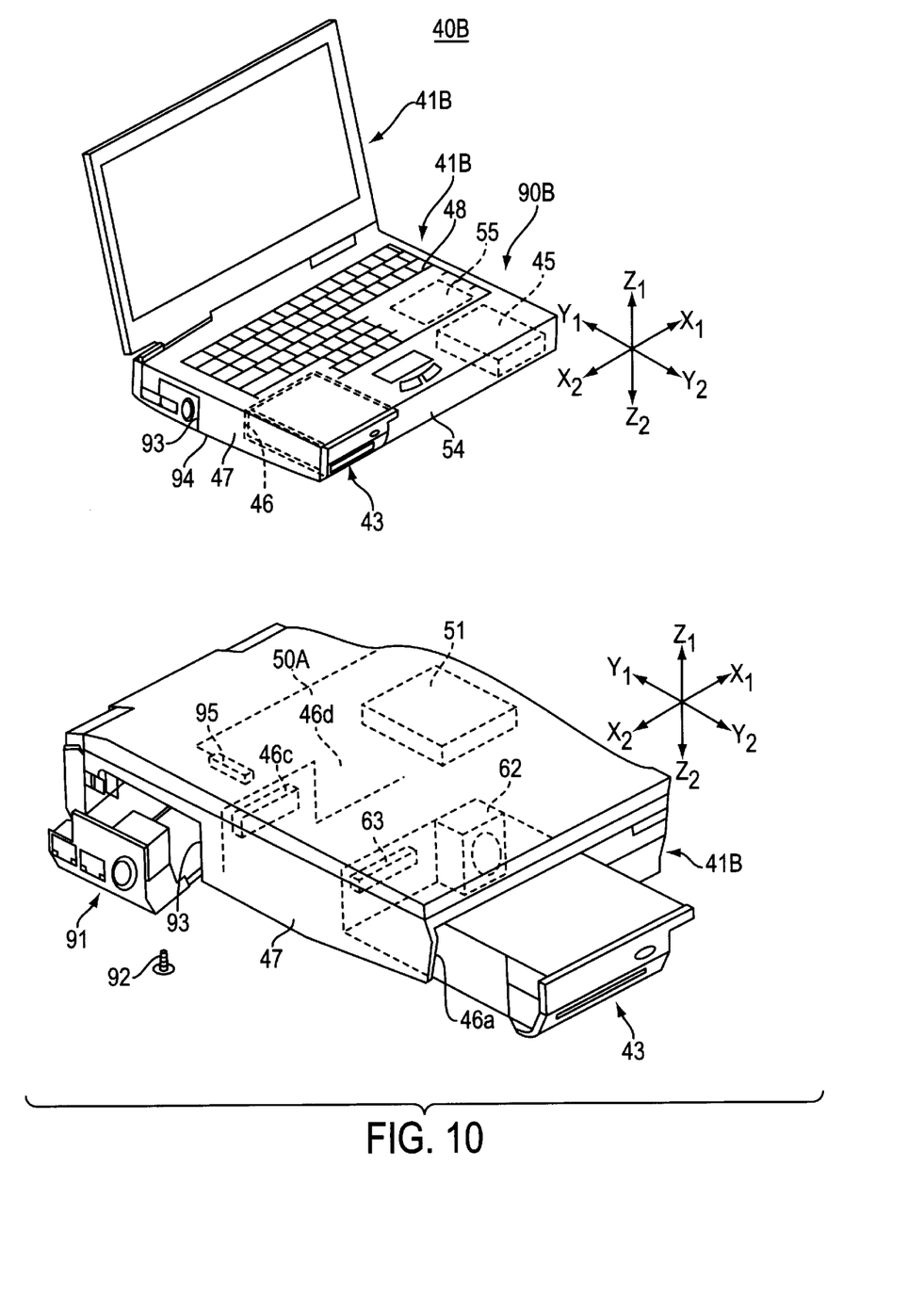
FIG. 10 is a perspective view of a notebook type personal computer according to a third embodiment of the present invention.
Figure 11:
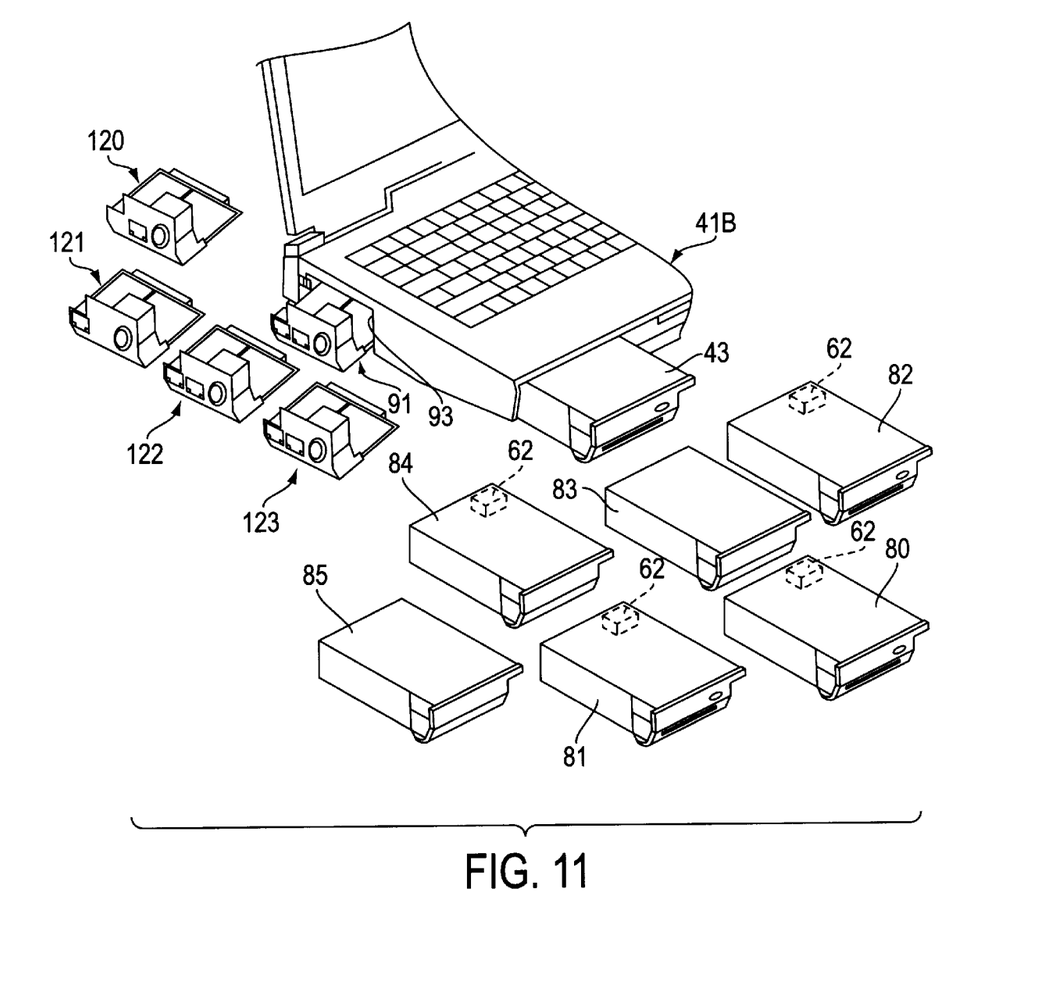
FIG. 11 is a perspective view of various peripheral devices and communication devices used in the third embodiment of the present invention.

A description will now be given, with reference to FIGS. 10 and 11, of a notebook type personal computer 40B according to a third embodiment of the present invention. The computer 40B has an arrangement obtained by combining the computers 40 and 40A respectively configured in accordance with the first and second embodiments of the present invention. In FIGS. 10 and 11, parts that are the same as those shown in FIGS. 2 through 9 are given the same reference numbers. Further, parts shown in FIGS. 10 and 11 which are not the same as those shown in FIGS. 2 through 9 but are related thereto are given the same numbers with a suffix "B" added thereto. The computer 40B has the modem/LAN communication functions. The CD-ROM/floppy disk combination drive 43 is loaded to the bay 46 so that the expanded functions are available.

A computer main body 41B has a common notebook personal computer main body 90B, to which the modem/LAN device 91 are secured by the screw 92. The common computer main body 90B differs from the common computer main body 90 shown in FIG. 7 in that the computer main body 90B has the bay 46. As shown in FIG. 10, the combination drive 43 is inserted into the bay 46 and the connector 63 is detachably connected to the connector 46c. The modem/LAN device 91 has the connector 101, which is connected to the connector 95, and is accommodated in the opening 93 so that the frame 100 shuts up the opening 93.

The computer 40B thus configured operates while the cooling fan 62 of the combination drive 43 and the cooling fan 102 of the modem/LAN device 91 are being driven. When the cooling fan 62 is rotated, the flows 70a, 70b and 70c of air shown in FIG. 5 are created as in the case of the computer 40, so that the floppy disk drive 60, the CD-ROM drive 61 and the CPU 51 can be efficiently and effectively cooled. When the cooling fan 102 is rotated, the flow 110 of air is created as shown in FIGS. 7 and 8, so that the CPU 51 as well as the modem module 52 and the LAN module 53 can be efficiently and effectively cooled.

FIG. 11 shows peripheral devices which can be loaded to the bay 46. Beside the CD-ROM/floppy disk combination drive 43, there are prepared the CD-ROM/high capacity floppy disk combination drive 80, the DVD˙ROM/floppy disk combination drive 81, the DVD-ROM/high capacity floppy disk combination drive 82, the secondary battery 83, and a secondary hard disk drive 84. There are prepared the modem device 120 with the modem module installed therein, the LAN device 121 with the LAN module installed therein, the modem/IEEE 1394 device 122 with the modem module and an IEEE 1394 installed therein, and the LAN/IEEE 1394 device 123 with the LAN and the IEEE 1394 device installed therein.

The above-mentioned cooling fans may be replaced by other types of cooling units.

The present invention is not limited to the specifically disclosed embodiments, and variations and modifications may be made without departing from the scope of the present invention.

What is claimed is:

1. A portable information processing device comprising:
a main body having a bay into which at least one expanded device selected from among a plurality of expanded devices that expand functions of the portable information processing devices is detachably loadable; and
an expanded device which is detachably loadable into the bay,
the expanded device including a cooling unit which is accommodated in the bay in a state in which the device is loaded into the bay, said cooling unit causing a flow of air which cools said expanded device.

2. The portable information processing device as claimed in claim 1, wherein the cooling unit is located in a deep portion of the bay in the state in which the device is loaded into the bay.

3. The portable information processing device as claimed in claim 1, wherein the cooling unit cools the portable information processing device.

4. The portable information processing device as claimed in any of claims 1, 2 or 4, wherein the cooling unit is a cooling fan.

5. The portable information processing device as claimed in any one of claims 1, 2, or 3, wherein the cooling unit cools the device itself in the state in which the device loaded into the bay.

6. An expanded device which can be loaded into a bay of a portable information processing device, at least one expanded device selected from among a plurality of expanded devices that expand functions of the portable information processing device being detachably loadable into the bay, said device comprising:
a cooling unit which is accommodated in the bay and is located into the portable information processing device in a state in which the device is loaded into the information processing device, said cooling unit causing a flow of air which cools said expanded device.

7. The expanded device as claimed in claim 6, wherein the cooling unit is located in a deep portion of the bay in the state in which the device is loaded into the bay.

8. The expanded device as claimed in claim 6, wherein the cooling unit cools the portable information processing device.

9. The expanded device as claimed in any of claims 6, 7, or 8, wherein the cooling unit is a cooling fan.

10. The portable device as claimed in any one of claims 6, 7, or 8, wherein the cooling unit cools the device itself in the state in which the device loaded into the bay.

11. A portable information processing device comprising:
a main body having an opening; and
an attachment unit which can be loaded into said opening in the main body of the portable information processing device,
wherein the attachment unit includes:
at least one module used within the main body, said module expanding functions of the portable information processing device;
a plate supporting the module; and
a cooling unit which cools both the module and the main body and is loaded into the main body with the attachment unit being attached to the main body.

12. The portable information processing device as claimed in claim 11, wherein the attachment unit is a communication device which can be attached to the main body in accordance with a communication specification.

13. The portable information processing device as claimed in claim 12, wherein the attachment unit includes at least one communication module which is detachably provided therein.

14. The portable information processing device as claimed in claim 11, wherein:

the attachment unit comprises a vertical wall which forms, with the attachment unit attached to the main body, part of a case of the portable information processing device and is substantially vertical to the plate; and the cooling unit is provided inside the vertical wall.

15. The portable information processing device as claimed in claim 11, wherein the cooling unit cools the main body of the portable information processing device.

16. The portable information processing device as claimed in any of claims 11–15, wherein the cooling unit is a cooling fan.

17. A portable information processing device as claimed in claim 11, wherein said cooling unit causes a flow of air to cool both the module and the main body.

18. An attavhment unit attached to a main body of portable information processing device, the attachment unit comprising:

at least one module used within the main body, said module expanding functions of the portable information processing device;

a plate supporting the module; and a cooling unit which cools both the module and the main body is loaded into the main body with the attachment unit being attavhed to the main body.

19. The attachment unit as claimed in claim 18, wherein the attachment unit is a communication device which can be attached to the main body in accordance with a communication specification.

20. The attachment unit as claimed in claim 19, wherein the attachment unit includes at least one communication module which is detachably provided therein.

21. The attachment unit as claimed in claim 18, wherein the attachment unit comprises a vertical wall which forms, with the attachment unit attached to the main body, part of a case of the portable information processing device and is substantially vertical to the plate; and the cooling unit is provided inside the vertical wall.

22. The attachment unit as claimed in claim 17, wherein the cooling unit cools the main body of the portable information processing device.

23. The attachment unit as claimed in any of claims 18 to 22, wherein the cooling unit is a cooling fan.

24. An attachment unit as claimed in claim 18, wherein said cooling unit causes a flow of air to cool both the module and the main body.

25. A portable information processing device comprising:

a main body having a bay into which at least one expanded device selected from among a plurality of expanded devices that expand functions of the portable information processing device is detachably loadable;

an expanded device which is detachably loadable into the bay; and an attachment unit attached to the main body, the expanded device including a first cooling unit which causes a flow of air to cool said expanded device and is accommodated in the bay in a state in which the expanded device is loaded into the bay, and the attachment unit including a second cooling unit which causes a flow of air to cool the attachment unit and is accommodated in the portable information processing device in a state in which the attachment unit is attached to the main body of the portable information processing device.

26. The portable information processing device as claimed in claim 25, wherein the first cooling unit is located in a deep portion of the bay in the state in which the device is loaded into the bay.

27. The portable information processing device as claimed in claim 26, wherein the first cooling unit cools the device itself in the state in which the device is loaded into the bay.

28. The portable information processing device as claimed in claim 25, wherein the first cooling unit cools the portable information processing device.

29. The portable information processing device as claimed in claim 25, wherein the attachment unit is a communication device which is attachable to the main body in accordance with a communication specification.

30. The portable information processing device as claimed in claim 29, wherein the attachment unit includes at least one communication module which is detachably provided therein.

31. The portable information processing device as claimed in claim 25, wherein the second cooling unit cools the attachment unit attached to the portable information processing device.

32. The portable information processing device as claimed in claim 26, wherein the second cooling unit cools the main body of the portable information processing device.

33. The portable information processing device as claimed in any of claims 25 to 32, wherein the first and second cooling units are, respectively, first and second cooling fans.

34. The portable information processing device as claimed in any one of claims 23 to 30, wherein the cooling unit is located in a deep portion of the bay in the state in which the device is loaded into the bay.

35. A portable information processing device comprising:

a main body having a bay into which at least one expanded device selected from among a plurality of expanded devices that expand functions of the portable information processing devices is detachably loadable; and an expanded device which is detachably loadable into the bay, the expanded device including a cooling unit which is accommodated in the bay in a state in which the device is loaded into the bay, said cooling unit cools said expanded device.

36. The portable information processing device as claimed in claim 35, wherein the cooling unit is located in a deep portion of the bay in the state in which the device is loaded into the bay.

37. The portable information processing device as claimed in claim 35, wherein the cooling unit cools the portable information processing device.

38. The portable information processing device as claimed in claim 35, wherein the cooling unit cools the device itself in the state in which the device is loaded into the bay.

39. The portable information processing device as claimed in claim 35, wherein the cooling unit is a cooling fan.

40. An expanded device which can be loaded into a bay of a portable information processing device, at least one expanded device selected from among a plurality of expanded devices that expand functions of the portable information processing device being detachably loadable into the bay, said device comprising:

a cooling unit which is accommodated in the bay and is located into the portable information processing device in a state in which the device is loaded into the information processing device.

41. The expanded device as claimed in claim 40, wherein the cooling unit is located in a deep portion of the bay in the state in which the device is loaded into the bay.

42. The expanded device as claimed in claim 40, wherein the cooling unit cools the portable information processing device.

43. The expanded device as claimed in claim 40, wherein the cooling unit cools the device itself in the state in which the device is loaded into the bay.

44. The expanded device as claimed in claim 40, wherein the cooling unit is a cooling fan.

45. A portable information processing device comprising:

a main body having a bay into which at least one expanded device selected from among a plurality of expanded devices that expand functions of the portable information processing device is detachably loadable;

an expanded device which is detachably loadable into the bay; and an attachment unit attached to the main body, the expanded device including a first cooling unit to cool said expanded device and is accommodated in the bay in a state in which the expanded device is loaded into the bay, and the attachment unit including a second cooling unit to cool the attachment unit and is accommodated in the portable information processing device in a state in which the attachment unit is attached to the main body of the portable information processing device.

46. The portable information processing device as claimed in claim 45, wherein the first cooling unit is located in a deep portion of the bay in the state in which the device is loaded into the bay.

47. The portable information processing device as claimed in claim 46, wherein the first cooling unit cools the device itself in the state in which the device is loaded into the bay.

48. The portable information processing device as claimed in claim 45, wherein the first cooling unit cools the portable information processing device.

49. The portable information processing device as claimed in claim 45, wherein the attachment unit is a communication device which is attachable to the main body in accordance with a communication specification.

50. The portable information processing device as claimed in claim 49, wherein the attachment unit includes at least one communication module which is detachably provided therein.

51. The portable information processing device as claimed in claim 45, wherein the second cooling unit cools the attachment unit attached to the portable information processing device.

52. The portable information processing device as claimed in claim 46, wherein the second cooling unit cools the main body of the portable information processing device.

53. The portable information processing device as claimed in claim 45, wherein the first and second cooling units are, respectively first and second cooling fans.

54. The portable information processing device as claimed in claim 45, wherein the cooling unit is located in a deep portion of the bay in the state in which the device is loaded into the bay.

* * * * *